US012202653B2

(12) United States Patent
Willems

(10) Patent No.: US 12,202,653 B2
(45) Date of Patent: Jan. 21, 2025

(54) GABLE-TOP PACKAGING CONTAINER

(71) Applicant: Elopak ASA, Spikkestad (NO)

(72) Inventor: Hans-Petter Willems, Terneuzen (NL)

(73) Assignee: Elopak ASA, Spikkestad (NO)

(*) Notice: Subject to any disclaimer, the term of this patent is extended or adjusted under 35 U.S.C. 154(b) by 18 days.

(21) Appl. No.: 17/800,227

(22) PCT Filed: Feb. 18, 2021

(86) PCT No.: PCT/EP2021/054005
§ 371 (c)(1),
(2) Date: Aug. 17, 2022

(87) PCT Pub. No.: WO2021/165385
PCT Pub. Date: Aug. 26, 2021

(65) Prior Publication Data

US 2023/0067325 A1 Mar. 2, 2023

(30) Foreign Application Priority Data

Feb. 18, 2020 (EP) .................................... 20158087

(51) Int. Cl.
*B65D 5/06* (2006.01)
*B31B 50/74* (2017.01)
(Continued)

(52) U.S. Cl.
CPC ............ *B65D 5/067* (2013.01); *B31B 50/747* (2017.08); *B31B 50/88* (2017.08); *B65D 5/62* (2013.01);
(Continued)

(58) Field of Classification Search
CPC .......... B65D 5/067; B65D 5/62; B65D 5/068; B65D 5/40; B65D 5/563; B65D 5/4266;
(Continued)

(56) References Cited

U.S. PATENT DOCUMENTS 4,762,234 A 8/1988 Wyberg
6,024,280 A * 2/2000 Marovskis ............. B65D 5/068 229/137
(Continued)

FOREIGN PATENT DOCUMENTS

GB 1120503 7/1968
GB 2539493 A * 12/2016 ......... B32B 37/0084
JP H08 48329 2/1996

OTHER PUBLICATIONS

ISR dated Mar. 25, 2021, cited inter alia as a statement of relevance for any non-English references cited therein.
(Continued)

*Primary Examiner* — Christopher R Demeree
(74) *Attorney, Agent, or Firm* — Christian D. Abel

(57) ABSTRACT

A method of producing a gable-top paper or paper-board based packaging container is disclosed, the packaging container having a plurality of top-closure sub-panels, including a top-closure sub-panel (132) configured to form a pouring spout of the packaging container when the packaging container is in an open position, the top-closure sub-panel being configured to form a pouring spout comprising top-fin panel sections (182*a*, 182*b*) being at least partially hot-sealed to each other prior to a first opening of the packaging container, the top-fin panel sections abutting one another in a contact region when the packaging container is in a closed position. The method comprises the steps of: producing a blank (100) from a laminate packaging material having an outside heat sealable layer; and treating the outside heat sealable layer in a sub-region (192*a*, 192*b*) of at least one of said top-fin panel sections (182*a*, 182*b*) reducing or eliminating the heat-sealing capacity of the outside heat sealable layer in the sub-region. A related blank and a packaging container produced from such a blank is also disclosed.

13 Claims, 3 Drawing Sheets

(51) Int. Cl.
*B31B 50/88* (2017.01)
*B31B 110/35* (2017.01)
*B31B 120/50* (2017.01)
*B65D 5/62* (2006.01)

(52) U.S. Cl.
CPC ....... *B31B 2110/35* (2017.08); *B31B 2120/50* (2017.08)

(58) Field of Classification Search
CPC ..... B65D 5/566; B32B 27/10; B32B 2307/31; B32B 2439/70; B32B 27/08; B32B 38/0036; B32B 2255/26; B32B 2307/7246; B32B 2307/7265; B29L 2009/00; B29L 2031/712; B29C 65/368; B29C 65/4815; B29C 66/1122; B41M 1/305; B41M 7/0027
USPC .... 229/125.42, 249, 137, 138, 5.81; 422/28; 427/361, 366, 536, 540
See application file for complete search history.

(56) References Cited

U.S. PATENT DOCUMENTS

2007/0284425 A1* 12/2007 Garvey .................. B65D 5/563
229/125.42
2018/0105353 A1* 4/2018 Bellamah ................. B65D 5/02

OTHER PUBLICATIONS

ESSR dated Apr. 14, 2020, cited inter alia as a statement of relevance for any non-English references cited therein.

* cited by examiner

GABLE-TOP PACKAGING CONTAINER

FIELD OF THE INVENTION

The present invention relates to a method of producing a gable-top paper or paper-board based packaging container. In particular, the present invention relates to a method of producing an easy opening gable-top packaging container having a gable closure, i.e. a gable-top packaging container that is designed to be opened by pushing open and pulling out a gusset panel of the gable-top to form a pouring spout.

The present invention also relates to a blank for producing an easy opening gable-top paper or paper-board based packaging container and to a packaging container produced from such a blank.

BACKGROUND

Gable top packaging containers, also known as cartons, are commonly used to distribute pourable products, e.g. liquid consumable products, e.g. dairy products, such as milk, or fruit juices.

A gable top packaging container is produced from a laminate packaging material, which typically comprises a multi-ply paper or paperboard sheet on which is laminated one or a plurality of layers for holding the pourable product and/or prevent migration of air and flavour degrading substances through the paperboard. A layer may typically comprise a polyethylene or an aluminium layer.

The laminate packaging material also typically comprises an inner and an outer heat sealable layer, e.g. made from a thermoplastic polymer.

In production of the packaging container, the laminate packaging material may be cut to form blanks, which may be folded, filled and sealed to form the packaging container.

To facilitate folding of the blank, the blank normally comprises crease lines. As is known in the art, a crease line is an embossed or impressed depression on one side of the paperboard with a corresponding raised ridge or welt on the other side forming a line along which the paperboard is structurally weakened and along which the paperboard will bend or fold in a controlled manner when pressure is applied.

Sealing of the packaging container is typically effectuated by heat seat sealing adjoining heat sealable layers of folded panel sections so that they fuse to form impermeable seams.

Generally, it is advantageous that the seams thus formed are as strong as possible. However, in gable-top packaging containers designed to be opened by pushing open and pulling out gable panels to form a pouring spout, too-a-strong top seal may make it difficult for a consumer to open the packaging container without compromising the structural integrity of the laminate packaging material. In particular, if the top seal is too strong, the laminate packaging material may easily de-laminate or partially de-laminate during a first opening.

With the above challenges in mind, the present disclosure seeks to bring forward a new method of producing a gable-top packaging container allowing easy opening.

SUMMARY OF THE INVENTION

With the abovementioned challenges and known solutions in mind, and according to a first example aspect, the present disclosure provides a method of producing a gable-top paper or paper-board based packaging container having gable closure comprising top-fin panel sections hot-sealed to each other prior to a first opening of the packaging container, the top-fin panel sections abutting each other in a contact region when the packaging container is in a closed position, the method comprising the steps of:

producing a blank from a laminate packaging material having an outside heat sealable layer; and treating the outside heat sealable layer in a sub-region of at least one of said top-fin panel sections reducing or eliminating the heat-sealing capacity of the outside heat sealable layer in the sub-region.

According to another example aspect, the present disclosure provides a method of producing a gable-top paper or paper-board based packaging container having a plurality of top-closure sub-panels, including a top-closure sub-panel configured to form a pouring spout of the packaging container when the packaging container is in an open position, the top-closure sub-panel being configured to form a pouring spout comprising top-fin panel sections being at least partially hot-sealed to each other prior to a first opening of the packaging container, the top-fin panel sections abutting one another in a contact region when the packaging container is in a closed position, the method comprising the steps of:

producing a blank from a laminate packaging material having an outside heat sealable layer; and treating the outside heat sealable layer in a sub-region of at least one of said top-fin panel sections reducing or eliminating the heat-sealing capacity of the outside heat sealable layer in the sub-region.

Said step of treating the outer heat sealable layer may comprise coating said sub-region with an adhesive layer. The adhesive layer may be silicon, ink or any other substance that will reduce the bond strength of the opposing surfaces during heat sealing.

The ratio between the area of said sub-region and the area of said contact region may be within the range of 0.5-0.9.

Said step of coating said sub-region may comprise printing said adhesive layer onto the sub-region.

Said step of printing said adhesive layer may comprise flexographically printing and UV curing an ink onto said sub-region.

Said step of flexographically printing said adhesive layer may comprise utilising a halftone reprographic technique.

Said step of utilising the halftone reprographic technique may comprise applying, in the sub-region, a dot-area coverage within the range of 50%-100%.

Said outer heat sealable layer may be made from LDPE (low-density polyethylene) and said step of treating the outer heat sealable layer may comprise corona treating the outer heat sealable layer in said sub-region to a dyne level exceeding any one of: 42 Dyne/cm, 45 Dyne/cm and 50 Dyne/cm and/or to a dyne level within the range of 50-60 Dyne/cm.

Said step of treating the outside heat sealable layer in the sub-region of said at least one top-fin panel section may comprise treating the outside heat sealable layer in the whole area of said at least top-fin panel section except for in a strip or band bordering a top edge of the blank. The strip or band may have a width within the range of 2 mm to 5 mm, i.e. it may extend 2 mm to 5 mm from the top edge of the blank.

The method may comprise the steps of:

providing an innermost heat sealable layer in the blank; and coating at least one section of the innermost heat sealable layer of the top-closure sub-with an adhesive layer reducing or eliminating the heat-sealing capacity of the innermost heat sealable layer in the coated section or sections.

According to a further example aspect, the present disclosure provides a packaging container blank made from a laminate packaging material having an outside heat sealable layer and comprising a first top-fin panel section and a second top-fin panel section configured to abut each other in a contact region when the packaging container is in a closed position and configured to form a pouring spout when the packaging container is in an open position, wherein the outside heat sealable layer, in a sub-region of at least one of said top-fin panel sections, is treated to reduce or eliminate the heat-sealing capacity of the outside heat sealable layer in the sub-region.

According to a yet further example aspect, the present disclosure provides a packaging container blank made from a laminate packaging material having an outside heat sealable layer and comprising a plurality of top-closure sub-panels, including a top-closure sub-panel configured to form a pouring spout of the packaging container when the packaging container is in an open position, wherein the top-closure sub-panel configured to form a pouring spout comprising a first top-fin panel section and a second top-fin panel section configured to abut one another in a contact region when the packaging container is in a closed position, the outside heat sealable layer being treated in a sub-region of at least one of said top-fin panel sections to reduce or eliminate the heat-sealing capacity of the outside heat sealable layer in the sub-region.

In the blank, the sub-region of the at least one top-fin panel section, the outside heat sealable layer may be treated by being coated with an adhesive layer.

In the blank, the ratio between the area of the sub-region and the area of the contact region may be within the range of 0.5-0.9.

In the blank, the adhesive layer may be printed onto the sub-region.

In the blank, said printed adhesive layer may comprise an ink being flexographically printed and UV cured onto said sub-region.

In the blank, the printed adhesive layer may be printed utilising a halftone reprographic technique. As is known in the art, the halftone reprographic technique involves laying down dots of ink on the printed surface, the dots varying in size and/or in spacing, thus enabling fine-graded control of the area covered by the ink.

In the blank, the printed adhesive layer may have a dot-area coverage within the range of 50%-100%.

In the blank, said outer heat sealable layer may be made from LDPE and in the sub-region of the at least one top-fin panel section the outside heat sealable layer may be corona treated to a dyne level exceeding any one of: 42 Dyne/cm, 45 Dyne/cm and 50 Dyne/cm, and/or to a dyne level within the range of 50-60 Dyne/cm.

In the blank, the outside heat sealable layer may be treated in the whole area of said at least top-fin panel section except for in a strip or band bordering a top edge of the blank. The strip or band may have a width within the range of 2 mm to 5 mm, i.e. it may extend 2 mm to 5 mm from the top edge of the blank.

The blank may comprise an innermost heat sealable layer and at least one section of the innermost heat sealable layer of the top-closure sub-panels may be coated with an adhesive layer reducing or eliminating the heat-sealing capacity of the innermost heat sealable layer in the coated section or sections.

According to a further example aspect, the present disclosure provides a gable-top paper or paper-board based packaging container being produced from a blank as disclosed above.

Above-discussed preferred and/or optional features of each aspect may be used, alone or in appropriate combination, in the other aspects of the invention.

DESCRIPTION OF THE DRAWINGS

Following drawings are appended to facilitate the understanding of the invention.

Figure 1:
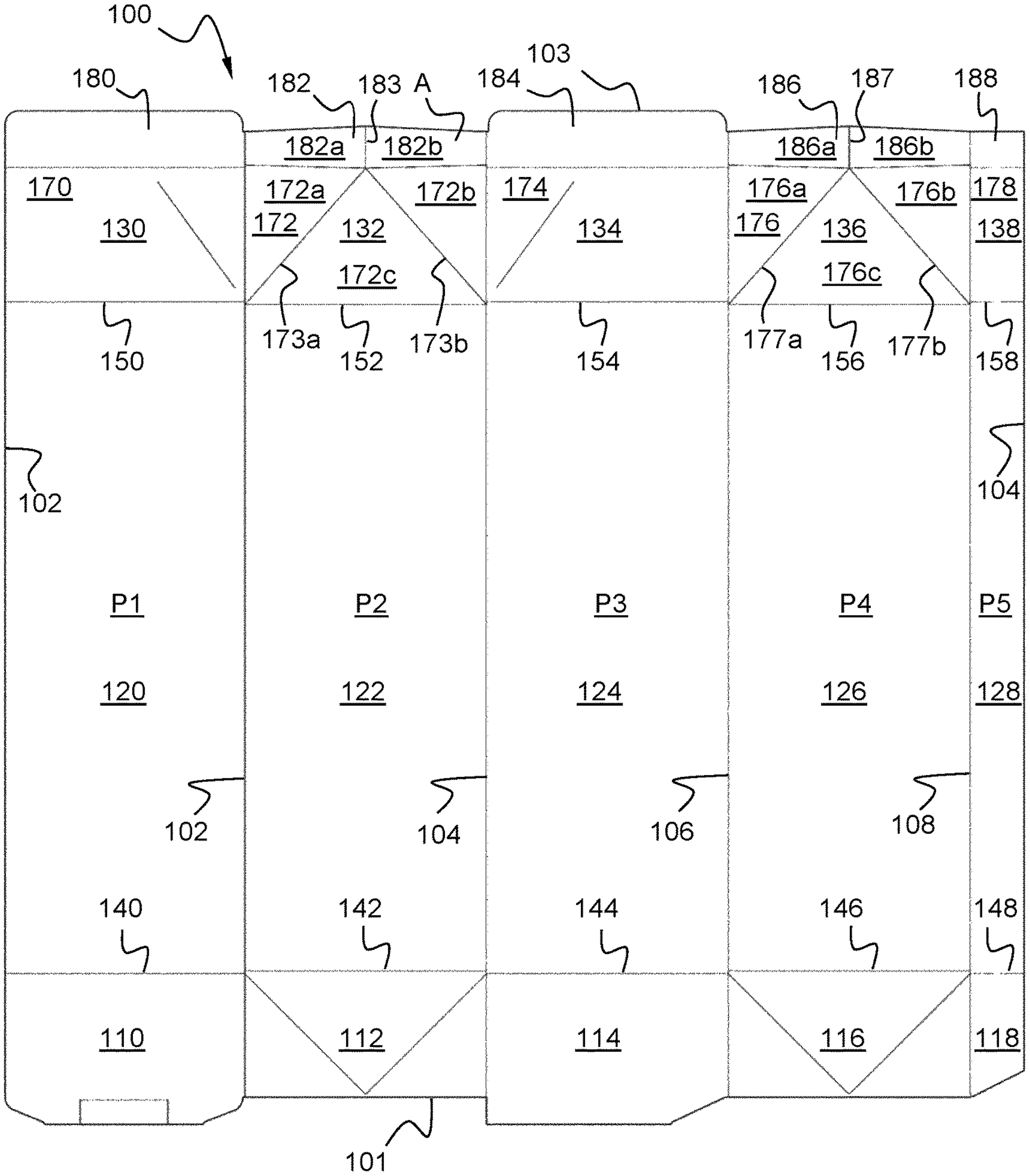
FIG. 1 is a top view of an outside surface of a blank according to an aspect of the disclosure.

It should be understood that the drawings are not intended to limit the invention to the subject-matter depicted in the drawings.

In the drawings, like reference numerals have been used to indicate common parts, elements or features unless otherwise explicitly stated or implicitly understood by the context.

DETAILED DESCRIPTION

In the following, specific embodiments of a blank and a container produced therefrom will be described in more detail with reference to the drawings. However, it is specifically intended that the invention as defined in the following claims is not limited to the embodiments and illustrations contained herein but includes modified forms of the embodiments including portions of the embodiments and combinations of elements of different embodiments as come within the scope of the claims.

An embodiment of a blank 100 according to the invention is disclosed in FIG. 1. The blank 100 is disclosed with the surface configured to form the outside surface of the container facing the viewer.

The blank 100 is made from a multi-ply paper or paperboard sheet on which is laminated one or a plurality of barrier layers for holding a pourable product, e.g. a liquid, and/or prevent migration of air and flavour degrading substances through the sheet.

The blank 100 is generally rectangular and comprises a first, bottom edge 101, a second, top edge 103 and parallel, third and second, side edges 105, 107. The side edges 105 and 107 are generally rectilinear and parallel, whereas the top and bottom edges 101 and 103 have an irregular shape. The blank 100 also comprises a plurality of crease lines defining folding lines along which the blank 100 is configured to be folded when formed into the carton.

The blank 100 comprises five panels, P1-P5, partitioned by longitudinal crease lines 102, 104, 106 and 108 defining folding lines extending across the panel 100 from the bottom edge 101 to the top edge 103. In the present embodiment, the longitudinal crease lines 102, 104, 106 and 108 are generally rectilinear, parallel and continuous, i.e. uninterrupted, and, consequently, extend longitudinally, i.e. vertically in FIG. 1, across the blank 100 between the bottom edge 101 and the top edge 103.

Each panel P1-P5 comprises a first sub-panel 110, 112, 114, 116, 118 forming a bottom-closure sub-panel, a second sub-panel 120, 122, 124, 126, 128 forming a wall section sub-panel, and a third sub-panel 130, 132, 134, 136, 138 forming a top-closure sub-panel. The bottom closure sub-panels 110, 112, 114, 116 and 118 are configured to form a bottom closure of the container, and the top-closure sub-panels 130, 132, 134, 136, 138 a top closure of the container. The fifth panel P5 is configured to be attached to an inside surface of the first panel P1 adjacent the side edge 105 when the container is formed.

First transversal crease lines 140-148 partition the bottom-closure sub-panels 110-118 from the wall section sub-panels 120-128. The crease lines 140-148 are generally aligned, i.e. arranged one after the other, and extend generally transversally across the blank 100. Likewise, second transversal crease lines 150-158 partition the wall section sub-panels 120-128 from the top-closure sub-panels 130-138, are generally aligned and extend generally transversally across the blank 100.

Top-fin crease lines 160-168 extend generally transversally across the blank 100 partitioning sub-sub panels 180-188 of the top-closure sub-panels 130-138 from sub-sub-panels 170-178. Sub-sub panels 180-188 form top-fin panels, or seal lips, of the blank, sub-sub-panels 170 and 174 form roof panels, and sub-sub-panels 172 and 176 form gusset panels.

Gusset panels 172 and 176 each comprises top diagonal crease lines 173*a*, 173*b* and 177*a*, 177*b*, respectively, partitioning the gusset panel 172, 176 into gusset panel sections 172*a*-172*c* and 176*a*-176*c*, respectively.

Top fin panels 182 and 186 each form a gable seal area and comprises a gable crease line 183 and 187, respectively, partitioning the top fin panel 182, 186 into gable seal area sections 182*a* and 182*b*, and 186*a* and 186*b*, respectively.

Figure 2:
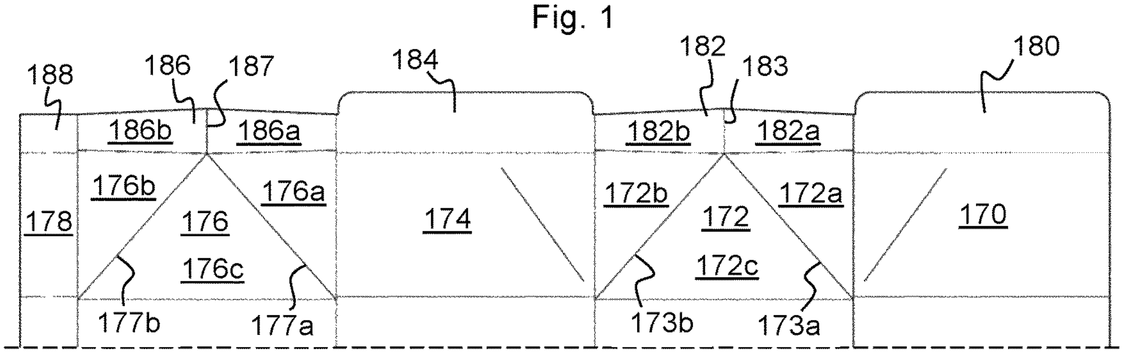
FIG. 2 is a detailed top view of an inside surface of a blank according to an aspect of the disclosure.

FIG. 2 shows the inside surface of the top-closure region of the blank 100, where the same crease lines, sub-panels and panel sections are indicated by corresponding reference numerals.

Figure 3:
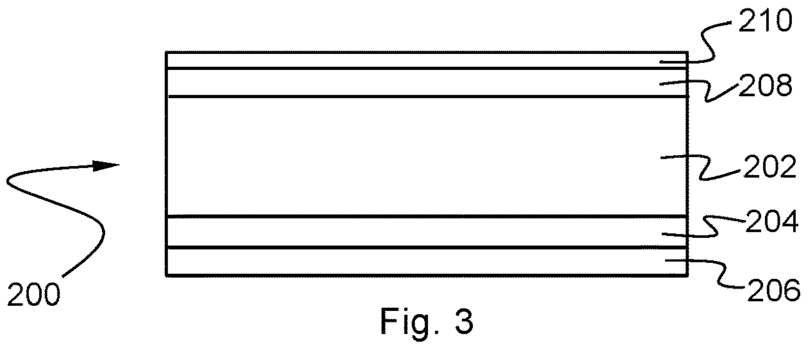
FIG. 3 is a schematic cut-through view of a laminate packaging material.

FIG. 3 shows a schematic cross-sectional view of an example of a packaging laminate 200 from which the above-discussed blank 100 may be made.

The packaging laminate 200 comprises a bulk layer 202 of paper or paperboard or other cellulose-based material. The bulk layer 202 may be a multi-ply bulk layer, i.e. comprise a plurality of sub-layers having different characteristics (e.g. having different bulk, different fibre composition etc.). The bulk layer 202 may be any material layer providing dimensional stability and direct or indirect stiffness to the packaging laminate 200, such as preferably a paperboard or carton or other cellulose-based material and may specifically be of a liquid paperboard quality (i.e. such as used for liquid food packages, aseptic liquid food packages and retortable food packages).

The packaging laminate 200 in FIG. 3 is oriented in a position in which all illustrated layers above the bulk layer 202 are intended to be turned to face outwards, while, correspondingly, all illustrated layers beneath the bulk layer 202 are intended to be turned to face inwards in a packaging container produced from the packaging laminate 200. In other words, the layers above the bulk layer 202 will form the outside of the finished packaging container, while the layers beneath the bulk layer 202 in FIG. 2 will consequently form the inside of the packaging container, at the same time as the bulk layer 202 constitutes a central layer in the walls, bottom and top of the packaging container. In order to facilitate an understanding of the present invention, the expressions “inside” and “outside” will hereafter be employed taking as the point of departure the central bulk layer 202.

On the inside of the bulk layer 202, the packaging laminate 200 may comprise a barrier layer 204 arranged to prevent migration of oxygen and/or flavour degrading substances through the packaging laminate 200. The barrier layer 204 may be laminated to the inside bulk layer 202 and may be adhered to the bulk layer 202 by any method and/or adhesive known in the art. For example, the barrier layer 204 may be laminated to the bulk layer through an intermediate lamination layer (not shown). The barrier layer 204 may comprise an aluminium foil, polyamide and EVOH barrier layers, vapour deposited and metallised films, etc. The intermediate lamination layer may be a thermoplastic material or polymer, such as a polyolefin, preferably low-density polyethylene, LDPE, but could also be another polyolefin, such as polypropylene (suitable for retortable packages), or other thermoplastic polymers, such as carboxylic-group modified polyolefins, such as EAA or EMAA.

Depending on the content to be held by the packaging container, the barrier layer 204 may be omitted.

The packaging laminate 200 comprises an innermost heat sealable layer 206. The heat sealable layer 206 serves a purpose of protecting the laminated structure, and in particular the bulk layer 202 and the cellulose fibres therein, from moisture originating from inside of the packaging container. If a barrier layer 204 is present, the heat sealable layer 206 may be laminated to the same. If a barrier layer is omitted, the heat sealable layer 206 may be laminated or otherwise adhered to the inside of the bulk layer 202.

The packaging laminate 200 also comprises an outer heat sealable layer 208. As the innermost heat sealable layer 206, the outer heat sealable layer 208 serves a purpose of protecting the laminated structure, and in particular the bulk layer 202 and the cellulose fibres therein, from moisture—in this case from moisture originating from outside the packaging container. The outer heat sealable layer 208 may be laminated to the outside of the bulk layer 202.

The innermost heat sealable layer 206 and the outside heat sealable layer 208 may be made from a thermoplastic polymer, e.g. a polyolefin, such as a polyethylene selected from LDPE (low-density polyethylene), LLDPE (linear low-density polyethylene), mLLDPE (metallocene low-density polyethylene) and blends of any thereof. Alternatively, the heat sealable layers 206 and 208 may be made from a heat sealable polypropylene homo- or copolymer, e.g. suitable for retortable packages.

Since the innermost heat sealable layer 206 and the outside heat sealable layer 208 have as a purpose to protect the bulk layer 202 from moisture, each layer 206 and 208 covers the whole inside and outside area of the packaging laminate 200.

On sections of the packaging laminate 200 forming visible portions of the packaging container—typically the wall section sub-panels 120-126 and the top-closure sub-panels 130 and 134 (see FIG. 1)—the packaging laminate 200 may comprise a decor layer 210, for example a decorative colour print, such as a printed colour pattern, optionally including text, nouns, marketing brands, logos etc. The decor layer 210 may be printed, e.g. using flexographic techniques, on the outside of the outer heat sealable layer 208. The decor layer 210 may be produced using a halftone reprographic technique where continuous-tone imagery is simulated through the use of dots of ink, varying either in size or in spacing, thus generating a gradient-like effect. Where continuous-tone imagery contains an infinite range of colours or greys, the halftone process reduces visual reproductions to an image that is printed with only one colour of ink, in dots of differing size (pulse-width modulation) or spacing (frequency modulation) or both. Colour printing can be produced by repeating the halftone process for each subtractive colour, e.g. using the CMYK colour model.

As an example, the decor layer 210 may be laid down onto sections of the packaging laminate 200 forming visible portions of the packaging container using flexographic printing and UV cured inks (UV-flexo inks).

As is known in the art, the innermost heat sealable layer 206 and the outside heat sealable layer 208 also have as a purpose to form seals when a packaging container is produced from the blank. The packaging container is normally produced from the blank in a filling machine by folding the fifth panel P5 to the first panel P1 and sealing the panels P1 and P5 in a longitudinal seam, e.g. by heat sealing the outside heat sealable layer of panel P5 to a corresponding section of the innermost heat sealable layer of panel P1, thus creating a tubular sleeve. Thereafter, the sleeve is bottom sealed by folding and sealing the bottom-closure sub-panels 110-118, thus creating an open-top proto-container. Thereafter the pourable product to be held by the container is filled into the proto-container through the open top and, finally, the top-closure sub-panels 130-138 are folded and sealed to each other.

As is known in the art, top sealing the proto container generally involves bringing the seal lips 180-188 into contact with each other and pressing and heating the seal lips to thereby heat seal adjoining heat sealable layers of the seal lips. In particular, top sealing the proto container generally involves bringing the inside surfaces of top-fin panel sections 186*a* and 182*b* into contact with the inside surface of top-fin panel 184 (see FIG. 2) and heat sealing adjoining sections of the innermost heat sealable layers of the top-fin panel 184 and the top-fin panel sections 186*a* and 182*b*, and, correspondingly, bringing the inside surfaces of top-fin panel sections 182*a* and 186*b* into contact with the inside surface of top-fin panel 180 (and the inside surface of interposed top-fin panel 188) and heat sealing adjoining sections of the innermost heat sealable layers of top-fin panel 180 (and interposed top-fin panel 188') and top-fin panel sections 182*a* and 186*b*.

Furthermore, top sealing involves bringing the outside surfaces of top-fin panel sections 182*a* and 182*b* into contact with each other and heat sealing adjoining sections of the outside heat sealable layers of the top-fin panel sections 182*a* and 182*b*, and, correspondingly, bringing the outside surfaces of top-fin panel sections 186*a* and 186*b* into contact with each other and heat sealing adjoining sections of the outside heat sealable layers of the top-fin panel sections 186*a* and 186*b*.

Said top-fin panels and panel sections, when brought into contact with each other, form a top fin and top sealing may be effectuated by pressing and heating the top fin in a suitable pressing and heating tool, e.g. a die (not shown).

Figure 7:
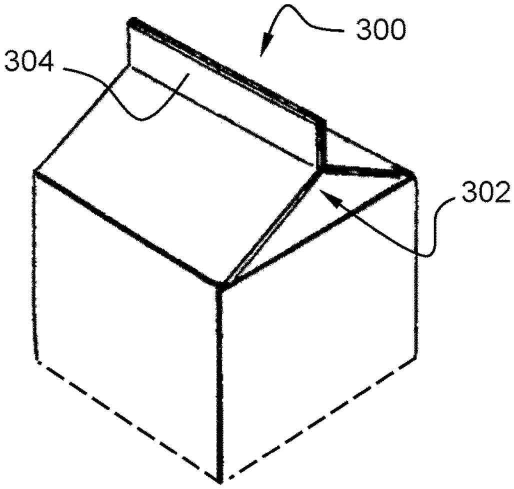
FIG. 7 schematically illustrates a closed gable-top packaging container.

FIG. 7 is a perspective view of a packaging container 300 comprising a gable closure 302 and a sealed top fin 304.

Figure 8:
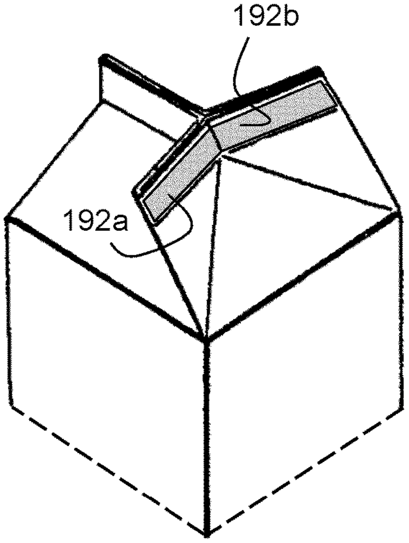
FIG. 8 schematically illustrates a semi-open gable-top packaging container.
Figure 9:
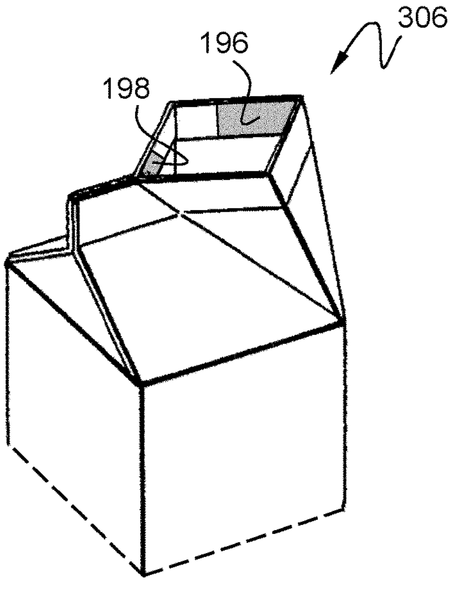
FIG. 9 schematically illustrates an open gable-top packaging container.

With reference to FIGS. 8 and 9, opening the packaging container 300 generally involves a first step of breaking the seal formed between the outside surfaces of top-fin panel sections 182*a* and 182*b* (see FIGS. 1 and 8) and a subsequent, second step of breaking the seals formed between the inside surfaces of top-fin panel 184 and top-fin panel section 182*b*, and between the inside surfaces of top-fin panel 180 and top-fin panel section 182*a*, respectively (see FIGS. 2 and 9).

The top-fin panel sections 182*a* and 182*b* are congruent, i.e. they are identical in size and shape. Consequently, when the packaging container 300 is in a closed position, the top-fin panel sections 182*a* and 182*b* abut one another in a contact region which generally corresponds to the region of the top-fin panel section 182*a* and 182*b*, respectively.

In the open position of the packaging container 300 (see FIG. 9), the top-closure sub-panel 132 (see FIGS. 1 and 9) forms a pouring spout 306 of the packaging container 300. In particular, the inside surfaces of top-fin panel sections 182*a* and 182*b* form pouring lips of the pouring spout 306.

According to the present invention, the opening force required in the first step is reduced by treating the outside heat sealable layer 208 in a sub-region of at least one of the top-fin panel sections 182*a* and 182*b* reducing or eliminating the heat-sealing capacity of the outside heat sealable layer 208 in the sub-region.

Figure 4:
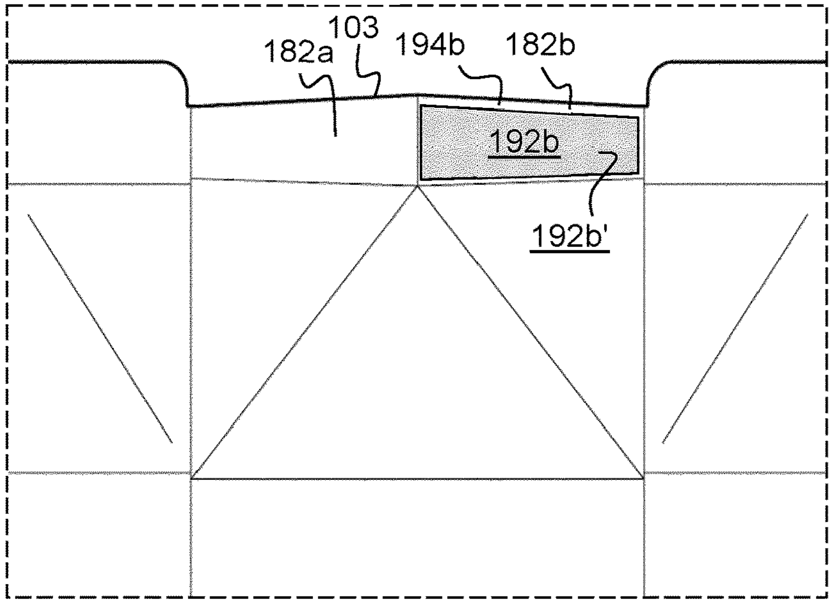
FIGS. 4 and 5 are detailed top views of an outside surface of a blank according to an aspect of the disclosure.

FIG. 4 shows an embodiment of a blank where the outside heat sealable layer 208 in a sub-region 192*b* of the top-fin panel section 182*b* has been treated to reduce or eliminate the heat-sealing capacity of the outside heat sealable layer 208 in the sub-region 192*b*. The outside heat sealable layer 208 in top-fin panel section 182*a* is left untreated. However, the outside heat sealable layer 208 in top-fin panel section 182*a* will only be able to create an effective heat seal with untreated portions of the outside heat sealable layer 208 in top-fin panel section 182*b*, i.e. in a strip 194*b* bordering the top edge 103 in the present embodiment.

Figure 5:
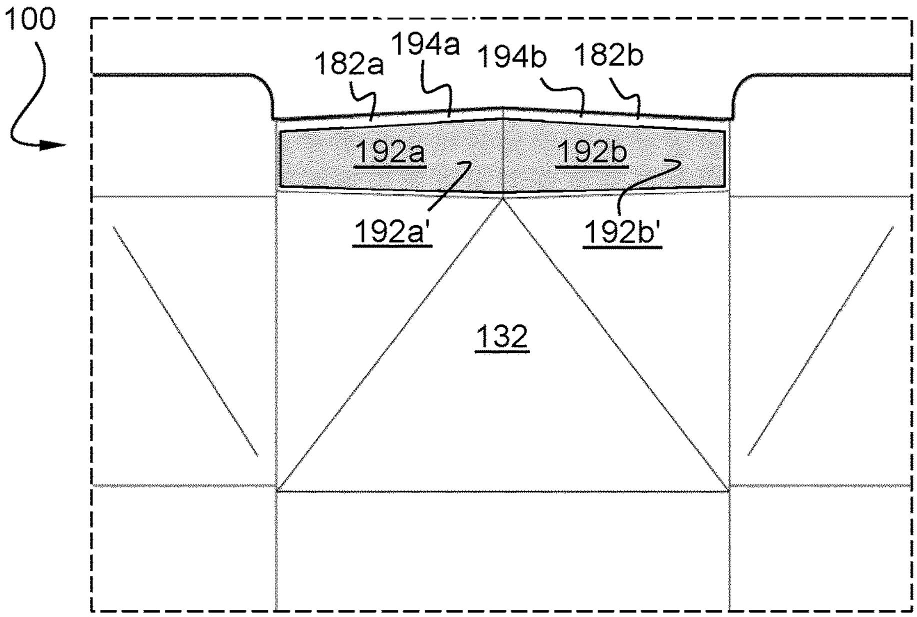

FIG. 5 shows an embodiment where the outside heat sealable layer 208 in a sub-region 192*a* of the top-fin panel section 182*a* has also been treated to reduce or eliminate the heat-sealing capacity of the heat sealable layer 208. In the present embodiment, the sub-regions 192*a* and 192*b* are congruent and, consequently, will overlap when the top-fin panel sections 182*a* and 182*b* are folded onto each other.

Generally, it is preferable that the area covered by the treated sub-region or sub-regions cover 50% to 90% of the area of the contact region between the top-fin panel sections 182*a* and 182*b*. In other words, the ratio between the area of the sub-region or sub-regions and the area of the contact region formed between the top-fin panel sections 182*a* and 182*b* should preferably be within the range of 0.5-0.9.

According to one embodiment, the outside heat sealable layer 208 in the whole of the top-fin panel sections 182*a* and 182*b* is treated to reduce or eliminate the heat sealing capacity except for a narrow strip or band 194*a*, 194*b* bordering the top edge 103. This will allow the top-fin panel sections 182*a* and 182*b* to be heat sealed to each other along the strip or band 194*a*, 194*b* but will prevent or at least reduce heat sealing in the rest of the contact region formed between the top-fin panel sections 182*a* and 182*b*. In one embodiment the strip or band 194*a*, 194*b* may have a width within the range of 2 mm to 5 mm, i.e. it may extend 2 mm to 5 mm from the top edge 103.

According to one embodiment, said treating of the sub-region 192*a* and/or 192*b* may comprise coating the sub-region 192*a* and/or 192*b* with an adhesive layer, e.g. silicon. This will effectively prevent the outside heat sealable layers 208 of the top-fin panel sections 182*a* and 182*b* from forming a heat seal in the sub-region 192*a* and/or 192*b*.

According to another embodiment, said treating of the sub-region 192*a* and/or 192*b* may comprise printing an adhesive layer onto the sub-region or sub-regions, e.g. flexographically printing an UV curable ink onto the sub-region 192*a* and/or 192*b*. The same ink as is applied as a decor layer 210 may be printed onto the sub-region 192*a* and/or 192*b*. This will allow the sub-region 192*a* and/or 192*b* to be treated in the same processing station as in which the decor layer 210 is printed onto the blank.

A halftone reprographic technique may advantageously be applied when flexographically printing the adhesive layer. This will allow the heat sealing capacity of the top-fin panel sections 182*a* and 182*b* to be controlled in detail since the technique allows fine-grained control of the dot-area coverage. The dot-area coverage may for example be within the range of 50%-100%, where a dot-area coverage of 50% implies that 50% of the printed region is covered by the adhesive material, e.g. UV curable ink, thus reducing the heat sealing capacity of the printed area by approximately 50% (as compared to un-printed areas), and where a dot-area coverage of 100% implies that the whole of the printed region is covered by the adhesive material, thus in practise eliminating heat sealing in the printed area.

As an alternative to coating the sub-region 192*a* and/or 192*b* with an adhesive material, the sub-region 192*a* and/or 192*b* may be subjected to corona treatment. Corona treatment (sometimes also referred to as air plasma treatment) is a surface modification technique that uses a low temperature corona discharge plasma to impart changes in the properties of a surface, in particular the surface energy. For LDPE, a material commonly used in heat sealable layers, it has been found that corona treating the heat sealable layer to a dyne level exceeding approximately 42 Dyne/cm decreases the heat sealing capacity of the outside heat sealable layer 208.

The corona plasma may be generated by the application of high voltage to an electrode that has a sharp tip, at which tip the plasma forms and according to one embodiment the laminate packaging material may be brought to pass such a tip in order to change the surface energy of the outside heat sealable layer 208 in the sub-region 192*a* and/or 192*b* such that the Dyne level of the outside heat sealable layer 208 is brought to exceed 42 Dyne/cm, more preferably to exceed 45 Dyne/cm, and even more preferably to exceed 50 Dyne/cm. According to one embodiment, the outer heat sealable layer in the sub-region 192*a* and/or 192*b* is corona treated to a dyne level within the range of 50-60 Dyne/cm.

Figure 6:
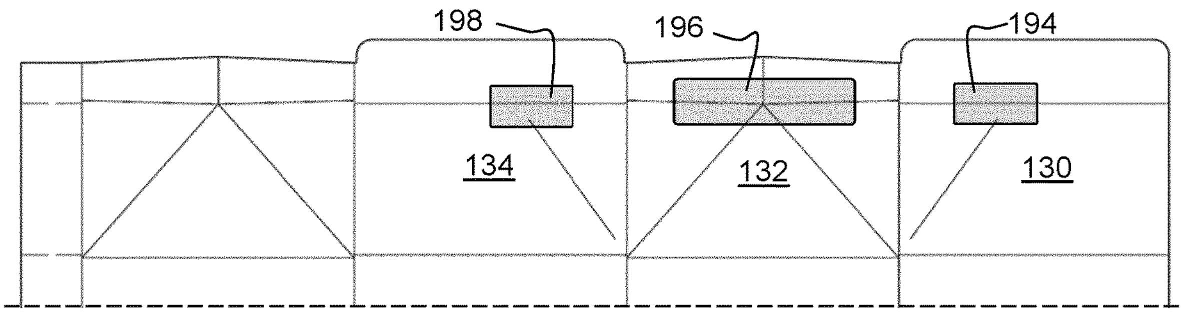
FIG. 6 is a detailed top view of an inside surface of a blank according to an aspect of the disclosure.

The opening force required in said second opening step, i.e. breaking the heat sealing formed between the inside surfaces of top-fin panel 184 and top-fin panel section 182*b*, and between the inside surfaces of top-fin panel 180 and top-fin panel section 182*a* (see FIGS. 2 and 9), may be reduced by coating sections of the innermost heat sealable layer 206 (se FIG. 3) of the top-closure sub-panel 130, 132 and/or 134 with an adhesive layer, e.g. silicon. Examples of such adhesive layers 194, 196, 198 are shown in FIG. 6. Providing easy opening in this manner is known as such and will not be discussed in any detail here. However, it has been found that providing easy opening according to the present invention, i.e. providing easy opening of the first opening step, is beneficial also for the second opening step. In particular, without wishing to be bound by theory, it is believed that by providing easy opening in the first opening step, i.e. when breaking the heat seal between the outside surfaces of top-fin panel sections 182*a* and 182*b* (see FIG. 1), the structural integrity of the packaging laminate 200 is conserved. This, in turn, reduces the risk of failure of the second opening step and increases the chances of successful breaking the heat seal between the inside surfaces of top-fin panel 184' and top-fin panel section 182*b*, and between the inside surfaces of top-fin panel 180' and top-fin panel section 182*a*, respectively, without compromising the structural integrity of the packaging laminate, e.g. without de-laminating or partial de-laminating the packaging material 200.

It is appreciated that certain features of the invention, which, for clarity, have been described above in the context of separate embodiments, may also be provided in combination in a single embodiment. Conversely, various features of the invention, which, for brevity, have been described in the context of a single embodiment, may also be provided separately or in any suitable sub-combination.

In the preceding description, various aspects of the blank and container according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to person skilled in the art to which the disclosed subject-matter pertains, may lie within the scope of the present invention as defined by the following claims.

The invention claimed is:

1. A method of producing a gable-top paper or paperboard based packaging container having a plurality of top-closure sub-panels including a top-closure sub-panel configured to form a pouring spout of the packaging container when the packaging container is in an open position, the top-closure sub-panel configured to form a pouring spout comprising top-fin panel sections being at least partially hot-sealed to each other prior to a first opening of the packaging container, the top-fin panel sections abutting one another in a contact region when the packaging container is in a closed position, the method comprising the steps of:

producing a blank from a laminate packaging material having an outside heat sealable layer; and treating the outside heat sealable layer in a sub-region of at least one of said top-fin panel sections reducing or eliminating the heat-sealing capacity of the outside heat sealable layer in the sub-region, wherein said step of treating the outer heat sealable layer comprises coating said sub-region with an abhesive layer, wherein said step of coating said sub-region comprises printing said abhesive layer onto the sub-region, wherein said step of printing said abhesive layer comprises flexographically printing and UV curing an ink onto said sub-region, and wherein said step of flexographically printing said abhesive layer comprises utilising a halftone reprographic technique.

2. The method according to claim 1, wherein a ratio between the area of said sub-region and the area of said contact region is within the range of 0.5-0.9.

3. The method according to claim 1, wherein said step of utilising the halftone reprographic technique comprises applying, in the sub-region, a dot-area coverage within the range of 50%-100%.

4. The method according to claim 1, wherein said outer heat sealable layer is made from LDPE and said step of treating the outer heat sealable layer comprises corona treating the outer heat sealable layer in said sub-region to a dyne level exceeding any one of: 42 Dyne/cm, 45 Dyne/cm and 50 Dyne/cm and/or to a dyne level within the range of 50-60 Dyne/cm.

5. The method according to claim 1, wherein said step of treating the outside heat sealable layer in the sub-region of said at least one top-fin panel section comprises treating the outside heat sealable layer in the whole area of said at least top-fin panel section (182*a*, 182*b*) except for in a strip or band bordering a top edge of the blank.

6. The method according to claim 1, comprising the steps of:

providing an innermost heat sealable layer in the blank; and coating at least one section of the innermost heat sealable layer of the top-closure sub-panels with an adhesive layer reducing or eliminating the heat-sealing capacity of the innermost heat sealable layer in the coated section or sections.

7. A packaging container blank made from a laminate packaging material having an outside heat sealable layer and comprising a plurality of top-closure sub-panels including a top-closure sub-panel configured to form a pouring spout of the packaging container when the packaging container is in an open position, the top-closure sub-panel configured to form a pouring spout comprising a first top-fin panel section (182*a*) and a second top-fin panel section configured to abut one another in a contact region when the packaging container is in a closed position, wherein the outside heat sealable layer being treated in a sub-region of at least one of said top-fin panel sections to reduce or eliminate the heat-sealing capacity of the outside heat sealable layer in the sub-region, wherein the outside heat sealable layer, in the sub-region of the at least one top-fin panel section, being treated by being coated with an abhesive layer, wherein said abhesive layer being printed onto the sub-region, wherein said printed abhesive layer comprising an ink being flexographically printed and UV cured onto said sub-region, and wherein the printed abhesive layer being printed utilising a halftone reprographic technique.

8. The blank according to claim 7, wherein a ratio between the area of said sub-region and the area of said contact region being within the range of 0.5-0.9.

9. The blank according to claim 7, wherein the printed adhesive layer having a dot-area coverage within the range of 50%-100%.

10. The blank according to claim 7, wherein said outer heat sealable layer being made from LDPE and by the outside heat sealable layer, in the sub-region of the at least one top-fin panel section, being corona treated to a dyne level exceeding any one of: 42 Dyne/cm, 45 Dyne/cm and 50 Dyne/cm, and/or to a dyne level within the range of 50-60 Dyne/cm.

11. The blank according to claim 7, wherein the outside heat sealable layer being treated in the whole area of said at least top-fin panel section except for in a strip or band bordering a top edge of the blank.

12. The blank according to claim 7, wherein the blank comprising an innermost heat sealable layer and by at least one section of the innermost heat sealable layer of the top-closure sub-panels being coated with an adhesive layer reducing or eliminating the heat-sealing capacity of the innermost heat sealable layer in the coated section or sections.

13. A gable-top paper or paper-board based packaging container produced from a blank according to claim 7.

* * * * *